United States Patent [19]

Gaeddert

[11] 4,248,143
[45] Feb. 3, 1981

[54] INTERLACING TWINE WRAPPING MECHANISM FOR ROTARY BALERS

[75] Inventor: Melvin V. Gaeddert, Newton, Kans.

[73] Assignee: Hesston Corporation, Hesston, Kans.

[21] Appl. No.: 43,504

[22] Filed: May 29, 1979

[51] Int. Cl.³ .............................................. B65B 13/18
[52] U.S. Cl. ............................................ 100/5; 100/13
[58] Field of Search .................. 100/5, 13, 88; 56/341

[56] References Cited

U.S. PATENT DOCUMENTS

| | | | |
|---|---|---|---|
| 3,064,556 | 11/1962 | Luebben | 100/5 |
| 4,022,003 | 5/1977 | Strausser | 56/341 |
| 4,167,844 | 9/1979 | Freimuth | 100/5 X |
| 4,169,410 | 10/1979 | Richardson | 100/5 |

*Primary Examiner*—Billy J. Wilhite

*Attorney, Agent, or Firm*—Schmidt, Johnson, Hovey & Williams

[57] ABSTRACT

During the twine wrapping cycle after complete formation of the bale, the bale continues to sping in the baling chamber, and twine from a pair of separate dispensing tubes is wrapped around the bale in helical fashion as the tubes swing back and forth along the length of the bale. The tubes swing in mutually opposite directions during the cycle and start and finish in a crossed position, thereby each moving from one end of the bale to the opposite end thereof and then back again to complete the cycle. As the tubes cross each other near the midlength of the bale during their return strokes, the twine strands become interlaced so as to more effectively bind the bale and promote structural integrity thereof. Separate cutoffs for each tube sever the twine strands as the tubes approach their home positions.

3 Claims, 10 Drawing Figures

INTERLACING TWINE WRAPPING MECHANISM FOR ROTARY BALERS

TECHNICAL FIELD

This invention relates to rotary balers and, more particularly, to so-called tying or "wrapping" mechanisms used to wind strands of twine around the cylindrical bales after formation so as to keep the bales from falling apart as they are discharged from the baler and thereafter handled by the farmer.

BACKGROUND ART

While balers that produce rectangular or prismatically shaped bales are almost universally provided with devices that not only wrap twine about the finished bales but also tie the opposite ends of such twine in secure knots, it has thus far typically been the practice in the so-called "round" or cylindrical bale field to simply wind convolutions of twine around the bale all along its length without tying off the opposite ends of the twine in a knot. This, of course, sacrifices a certain degree of structural integrity of the finished bale, yet it greatly simplifies the various mechanisms involved in such balers, provides less opportunity for malfunction and lowers the overall costs involved. While such simplification, reliability, etc. are indeed desirable, by the same token it is imperative that the finished bale not be so unstable that it will simply fall apart as it is discharged from the baler or thereafter handled by the farmer during loading, transport and unloading between various locations.

SUMMARY OF THE PRESENT INVENTION

Accordingly, one important object of the present invention is to provide a twine wrapping mechanism which promotes structural integrity of the finished bale but without the cost and complexity of knotter mechanisms that would tie the opposite ends of the wrapping twine into a knot.

Pursuant to the above, the present invention utilizes a pair of separate twine dispensing members or tubes mounted for swinging movement about separate pivots adjacent the front of the baler and so located that their respective outlet ends can sweep back and forth along the length of the bale from end-to-end thereof during the wrapping cycle. The dispensing tubes swing in mutually opposite directions during the cycle and start from a mutually crossed condition in which their respective outlet ends are in home positions adjacent corresponding opposite ends of the bale. Thereafter, the tubes become progressively uncrossed and sweep outwardly toward mid-cycle positions at which time the outlet ends are located adjacent respective opposite ends of the bale. By this time, the bale that is spinning in the bale chamber has picked up the dangling free ends of the twine strands and has commenced wrapping itself with the strands such that, as the tubes then return toward their home positions and cross at midlength of the bale, the strands become interlaced and the bale thus becomes tightly bound. Upon reaching their respective home positions, the twine strands are severed by individual cutters, whereupon the cycle is complete and the bale is ready for discharge.

DETAILED DESCRIPTION

Figure 1:
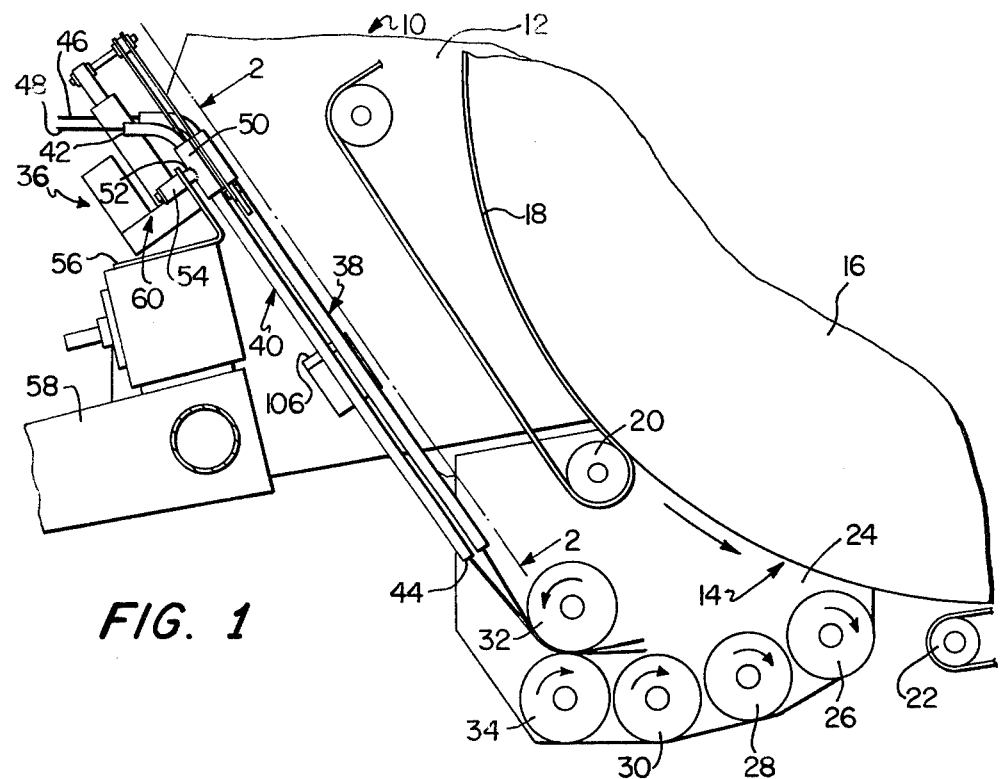
FIG. 1 is a fragmentary, elevational view of certain portions of a rotary baler incorporating twine wrapping mechanism pursuant to the principles of the present invention, portions of the baler being shown schematically and other portions being removed to reveal details of construction.

The baler 10 is only fragmentarily shown in the drawings, but it will be well understood by those skilled in the art that the sidewalls 12 and 13 help define a baling chamber denoted broadly by the numeral 14 and illustrated in FIG. 1 as being occupied by a finished bale 16. The baling chamber 14 is further defined in a fore-and-aft direction by any one of a variety of means well understood by those skilled in the art. In the present example, such chamber-defining means includes a set of bale-tensioning belts 18 which normally stretch diagonally across the inlet of chamber 14 beneath a pair of guide rollers 20 and 22 but which are illustrated in FIG. 1 as being deflected by the bale 16 into a condition substantially enveloping the entire periphery of the bale 16. Such inlet to the baling chamber 14 is indicated generally by the numeral 24 and, as aforementioned, the belts 18 normally span such inlet 24 in a diagonally upwardly and forwardly extending attitude such that, when the belts 18 are driven upwardly and forwardly and hay material is brought into contact with the belts 18, the upward and forward movement of the latter tends to make such material tumble forwardly and begin rolling into a bale. As the bale begins to grow in diameter, it shifts rearwardly up into the chamber 14 and deflects the belts 18 in the process until reaching the approximate size illustrated in FIG. 1.

Also assisting in bale starting is a series of rollers 26, 28 and 30 that are driven clockwise as illustrated in FIG. 1 so as to deliver material rearwardly to the belts 18 and provide an effective, rearwardly moving surface for the tumbling material, such material being fed into the vicinity of the rollers 26–30 and the belts 18 by a pair of oppositely rotating feed rollers 32 and 34.

As will be well understood by those skilled in the art, the means selected to drive the bale during formation, to apply tension thereto for compaction purposes, and to initiate rolling of new crop material into a bale is largely a matter of choice insofar as the principles of the present invention are concerned. Thus, it is to be understood that the means herein illustrated for carrying out such functions are shown by way of example only.

Situated forwardly of the baling chamber 14 is mechanism broadly denoted by the numeral 36 for wrapping the bale 16 with twine after the bale 16 has reached its final size. Such mechanism 36 includes a pair of separate twine-dispensing tubes 38 and 40 each having a generally upper, forwardly disposed inlet end 42 and a lower, rearwardly disposed outlet end 44. The inlet ends 42 of the tubes 38,40 are adapted to receive respective twine strands 46 and 48 from two separate sources of supply (not shown), and such strands 46 and 48 issue from the outlet ends 44 of their respective tubes 38 and 40.

Each of the tubes 38 and 40 has a collar 50 adjacent its upper end 42 which is fixed to the corresponding tube 38,40 and which is provided with a stud 52 projecting outwardly and generally forwardly therefrom in perpendicular relationship to the longitudinal axis of the respective tube 38 or 40. The stud 52 is in turn received within a suitable bearing 54 supported on a transversely extending angle bracket 56 common to both tubes 38,40 and ultimately supported by the tongue 58 of the baler 10 or other suitable framework. Hence, the studs 52 and bearings 54 define pivots 60 that adapt the tubes 38 and 40 for swinging movement between the extreme positions illustrated in FIG. 2 from one end of the bale chamber 14 to the other as defined by the sidewalls 12 and 13.

Figure 2:
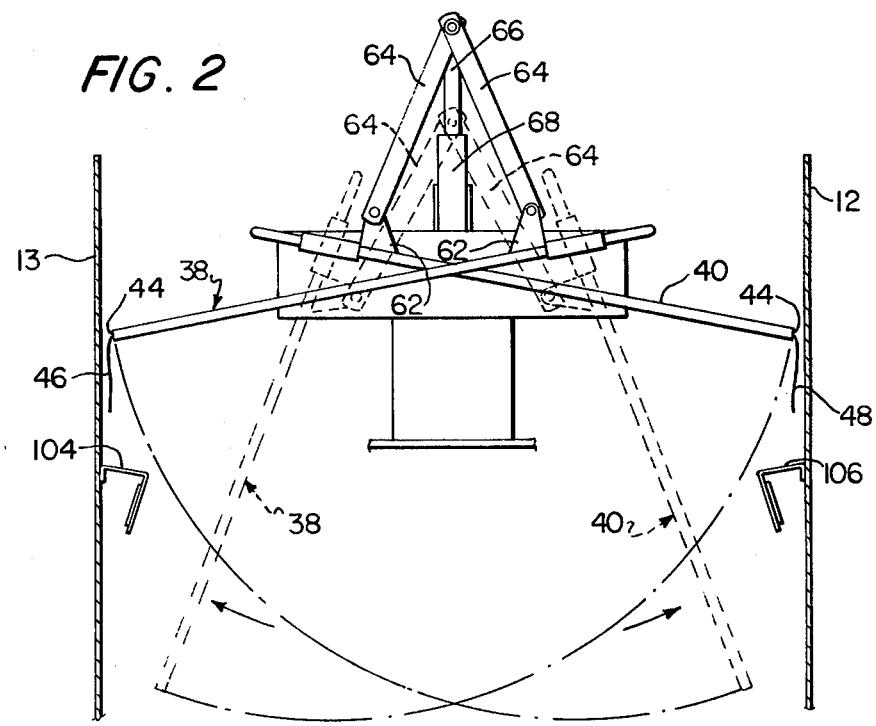
FIG. 2 is a fragmentary, plan view of the wrapping mechanism taken substantially along line 2—2 of FIG. 1, the solid lines illustrating the mechanism with the tubes in their home positions and the phantom lines indicating the condition of the mechanism when the tubes are midcycle.

As illustrated perhaps most clearly in FIG. 1, the tubes 38 and 40 are disposed in superimposed planes such that the tubes 38 and 40 do not strike one another during swinging movement between their opposite extreme positions. Consequently, when the tubes 38 and 40 are in their home positions as illustrated in FIG. 2, they are disposed in crossed relationship to one another as shown.

The mechanism 36 further includes means for driving the tubes 38,40, and to this end each of the tubes 38,40 has a lug 62 fixed thereto just below the collar 50, said lug 62 in turn being pivotally connected to an operating link 64. The two links 64 of tubes 38,40 are in turn pivotally connected at their ends remote from the lugs 62 to the outer end of a common reciprocable plunger 66 that telescopes into and out of a tubular housing 68, the motor for driving the plunger 66 being illustrated only in the circuit diagram of FIG. 10 and being denoted by the numeral 70 therein.

Figure 10:
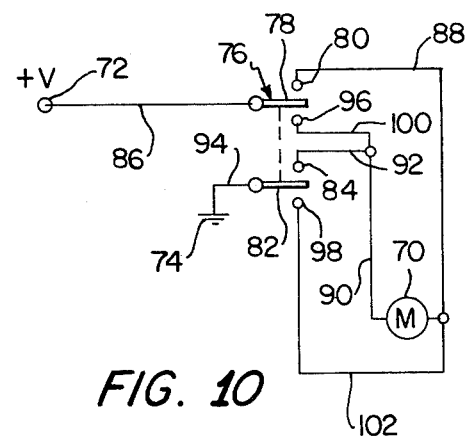
FIG. 10 is a schematic wiring diagram of the circuitry associated with the wrapping mechanism of the present invention.

As illustrated in FIG. 10, the motor 70 for the tubes 38,40 is indeed electrically powered, although it is to be understood that the tubes 38,40 could be manually operated if desired or could be powered by any number of different types of mechanical devices. In any event, as illustrated, the motor 70 is connected between the positive terminal 72 of a source of electrical potential and ground negative 74 by either of a pair of circuit paths as determined by the position of a double pole, double throw switch 76. In this regard, when the switch 76 is in the position illustrated in FIG. 10, the motor 70 is in a standby condition. However, when the switch 76 is thrown in a direction to cause the pole 78 to engage the contact 80 and the pole 82 to engage the contact 84, and electrical circuit path is formed via leads 86, 88, 90, 92 and 94 to drive the motor 70 in one direction, e.g., in a direction to retract the plunger 66. On the other hand, when the poles 78 and 82 are thrown in the opposite direction so as to engage the contacts 96 and 98, a circuit path is created including leads 86, 100, 90, 102 and 94 so as to drive the motor 70 in the opposite direction, e.g., in a direction to extend the plunger 66.

Each of the dispensing tubes 38 and 40 is provided with its own cutter for severing the twine upon completion of the wrapping cycle. To this end, a pair of stationary cutters 104 and 106 project inwardly from the sidewalls 13 and 12 respectively in strategic positions that place the cutters 104,106 within the path of travel of the relatively taut twine strands 46 and 48 as the tubes 38,40 swing toward their home positions. As the taut strands drag across the cutters 104,106, the strands become severed to complete the wrapping cycle. It will, of course, be understood by those skilled in the art that the cutters 104 and 106 may take a variety of forms and that the stationary form herein illustrated is by way of example only.

OPERATION

Figure 3:
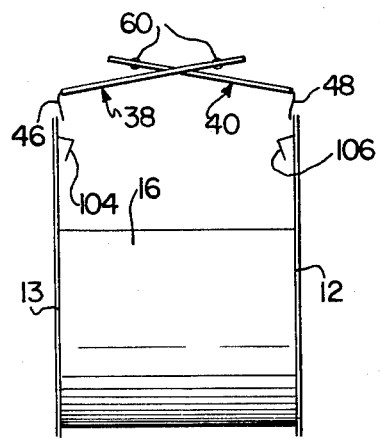
FIGS. 3-9 are diagramatic views on a reduced scale of the mechanism in conjunction with a bale being wrapped and illustrating the various positions of the twine tubes during the wrapping cycle.
Figure 4:
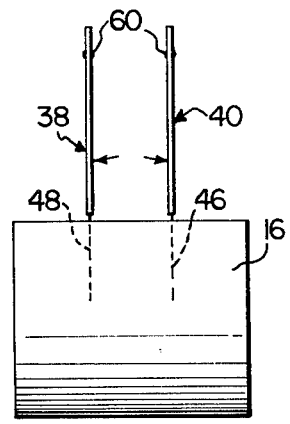

The twine tubes 38 and 40 are normally positioned in their home positions as illustrated in FIG. 3 (see also FIG. 2), at which time the tubes 38 and 40 are crossed and relatively short portions of the twine strands 46,48 dangle freely from the outlet ends 44 of the tubes 38,40. When the bale 16 is substantially completed, the operator initiates the wrapping cycle as the last portion of hay is being delivered by the feed rollers 32,34 into the baling chamber 14, such initiating of the cycle being effected by closing the switch 76 in the appropriate direction to energize the motor 70 so as to retract the plunger 66 from its solid line position in FIG. 2. This action causes the tubes 38 and 40 to swing downwardly and inwardly until reaching their approximate parallel positions as illustrated in FIG. 4, at which time the dangling free ends of the twine strands 46,48 become involved with the crop material fed into the baler such that the strands 46,48 are captured between the feed rollers 32,34. Hence, as the bale 16 continues to spin, the twine strands 46,48 start to wrap around the bale 16, whereupon the operator ceases further forward motion of the baler 10 and simply continues to spin the bale 16 to effectuate the wrapping cycle.

Figure 5:
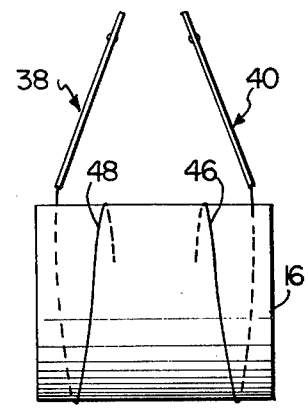

As the tubes 38,40 continue to swing outwardly and the bale 16 continues to spin, the twine strands 46 and 48 begin to wrap around the bale 16 to the extent illustrated in FIG. 5 and reach the ends of the bale 16. It is particularly noteworthy that by the time the tubes 38,40 are at this midpoint in the cycle, enough of the twine strands have been wrapped around the bale to hold the strands rather firmly. Thus, the convolutions around the ends are also fairly tight, and, as seen below, they become even more secure as additional overlapping wraps are made during the return strokes of tubes 38,40. This is in contrast to many prior mechanisms which were incapable of tightly wrapping the bales at their opposite ends.

Figure 6:
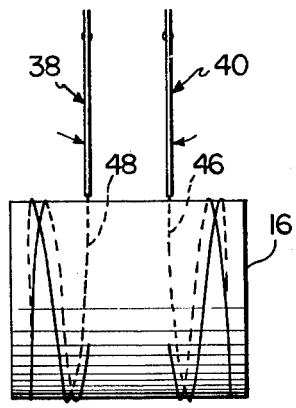
Figure 7:
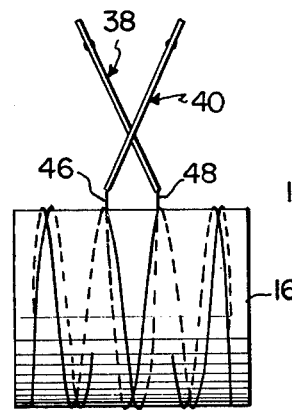
Figure 8:
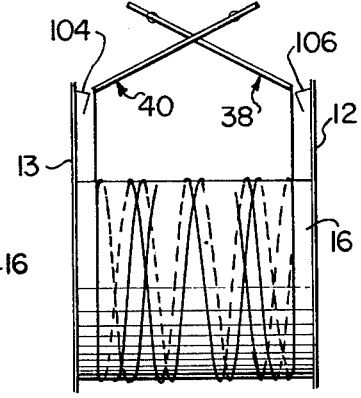

When the switch 76 is thrown in an opposite direction so as to reverse the motor 70 and cause the plunger 66 to extend, the tubes 38,40 swing inwardly toward their positions shown in FIG. 6, thereby reversing the lead of the helical convolutions previously placed on the spinning bale 16 and overlapping the previous wraps. As the tubes 38,40 then reach the mid-length of the bale 16 as illustrated in FIG. 7, they cross and effectively interlace the twine strands 46 and 48 so as to tightly and securely bind the bale 16. Continued swinging of the tubes 38,40 finds them approaching their home positions as in FIG. 8, at which time the strands 46,48 near the cutters 104 and 106.

Figure 9:
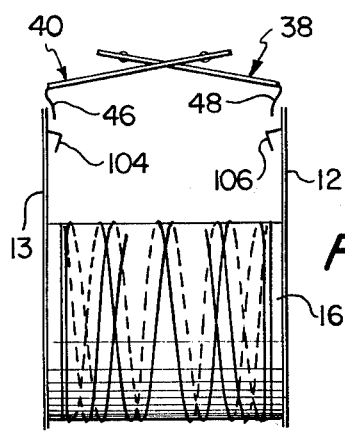

Just subsequent to the condition of things in FIG. 9, the tubes 38,40 arrive at their home positions in a crossed condition, by which time the strands 46 and 48 have been dragged against the sharp edges of cutters 104 and 106 to sever the same. Thereafter, the securely bound bale 16 may be discharged from the baler 10 with the assurance that it can be safely handled by various equipment utilized to move the bale from location to location.

I claim:

1. In a rotary baler having a baling chamber and means for spinning a cylindrical bale of material about its longitudinal axis within said chamber upon completion of a bale-forming process in the baler, mechanism for wrapping the completed and spinning bale with convolutions of twine to promote structural integrity of the bale, said mechanism including:

- a pair of twine dispensing members each having a twine outlet from which a corresponding strand of twine may issue,
- each of said members being shiftable in directions causing said outlets thereof to travel back and forth along the length of said bale chamber starting from a home position adjacent one end of the chamber, leading to a mid-cycle position adjacent the opposite end of the chamber and then returning to said home position,
- the respective paths of travel of said members mutually overlapping one another;
- means for driving said members in mutually opposite directions and to such an extent during and shifting that said members pass each other at approximately midlength of the chamber at least during said returning movement toward home position whereby to mutually interlace the twine strands; and
- a pair of separate cutters so positioned on said baler as to be usable in severing the strands of twine from the outlets of their respective members after the bale has been wrapped by the strands and upon return of the members to said home positions thereof.

2. In a rotary baler as claimed in claim 1, wherein each of said members is provided with a pivot mounting the same for swinging movement between said positions.

3. In a rotary baler as claimed in claim 1, wherein each of said members is tubular, having an entry for the corresponding twine strand at one end and said outlet at the opposite end.

* * * * *